(12) United States Patent
Rising, III

(10) Patent No.: US 7,120,640 B2
(45) Date of Patent: Oct. 10, 2006

(54) FORMAL VERIFICATION OF SEMANTIC DS

(75) Inventor: Hawley K. Rising, III, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 582 days.

(21) Appl. No.: 09/904,449

(22) Filed: Jul. 11, 2001

(65) Prior Publication Data

US 2002/0059290 A1 May 16, 2002

Related U.S. Application Data

(60) Provisional application No. 60/217,785, filed on Jul. 11, 2000.

(51) Int. Cl.
*G06F 17/30* (2006.01)
(52) U.S. Cl. ............... 707/102; 707/101; 707/3
(58) Field of Classification Search ............... 707/104, 707/101, 100, 5, 6, 103; 345/854; 382/305
See application file for complete search history.

(56) References Cited

U.S. PATENT DOCUMENTS

| | | | |
|---|---|---|---|
| 5,579,471 A | | 11/1996 | Barber et al. |
| 5,652,880 A | * | 7/1997 | Seagraves ............... 707/103 R |
| 5,852,819 A | * | 12/1998 | Beller ............................ 707/1 |
| 6,094,649 A | * | 7/2000 | Bowen et al. ................. 707/3 |
| 6,154,213 A | * | 11/2000 | Rennison et al. ............ 345/854 |
| 6,263,335 B1 | * | 7/2001 | Paik et al. ....................... 707/5 |
| 6,317,748 B1 | * | 11/2001 | Menzies et al. .......... 707/103 X |
| 6,396,963 B1 | * | 5/2002 | Shaffer et al. .............. 382/305 |
| 6,492,998 B1 | | 12/2002 | Kim et al. |
| 6,609,118 B1 | * | 8/2003 | Khedkar et al. ............ 705/400 |
| 6,697,818 B1 | * | 2/2004 | Li et al. .................. 707/103 R |

* cited by examiner

*Primary Examiner*—Jean M. Corrielus
(74) *Attorney, Agent, or Firm*—Blakely, Sokoloff, Taylor & Zafman LLP

(57) ABSTRACT

A method for use in classifying, storage and retrieval of audiovisual information. The method uses the elements of a semantic description to describe arbitrary structure related to the audiovisual information. The method includes: (1) providing entities describing non-relational parts of the semantic description, the entities including a concept having a collection of properties of the audiovisual information, and (2) referencing one or more interior structures of the concept from all entities in the semantic description.

12 Claims, 2 Drawing Sheets

FORMAL VERIFICATION OF SEMANTIC DS

CROSS-REFERENCES TO RELATED APPLICATIONS

This application claims priority from co-pending U.S. Provisional Patent Appliation No. 60/217,785 filed Jul. 11, 2000 entitled FORMAL VERIFICATION OF SEMANTIC DS which is hereby incorporated by reference, as is set forth in full in this document, for all purposes.

BACKGROUND OF THE INVENTION

The present invention relates to audio visual information systems, and more specifically to a system for describing, classifying, and retrieving audiovisual information for semantic descriptions of audiovisual information.

The amount of multimedia content available on the World Wide Web and in numerous other databases is growing out of control. However, the enthusiasm for developing multimedia content has led to increasing difficulties in managing accessing and identifying and such content mostly due to their volume. Further more, complexity and a lack of adequate indexing standards are problematic. To address this problem, MPEG-7 is being developed by the Moving Pictures Expert Group (MPEG), which is a working group of ISO/IEC. In contrast to preceding MPEG standards such as MPEG-1 and MPEG-2 which relate to coded representation of audio-visual content, MPEG-7 is directed to representing information relating to content, and not the content itself.

The MPEG-7 standard, formally called the "Multimedia Content Description Interface" seeks to provide a rich set of standardized tools for describing multimedia content. It is the objective to provide a single standard for providing interoperable, simple and flexible solutions to the aforementioned problems vis-à-vis indexing, searching and retrieving multimedia content. It is anticipated that software and hardware systems for efficiently generating and interpreting MPEG-7 descriptions will be developed.

More specifically, MPEG-7 defines and standardizes the following: (1) a core set of Descriptors (Ds) for describing the various features of multimedia content; (2) Description Schemes (DSs) which are pre-defined structures of Descriptors and their relationships; and (3) a Description Definition Language (DDL) for defining Description Schemes and Descriptors.

A Descriptor (D) defines both the semantics and the syntax for representing a particular feature of audiovisual content. A feature is a distinctive characteristic of the data which is of significance to a user. . . .

As noted, DSs are pre-defined structures of Descriptors and their relationships. Specifically, the DS sets forth the structure and semantics of the relationships between its components having either Descriptors and/or Description Schemes. To describe audiovisual content, a concept known as syntactic structure which specifies the physical and logical structure of audiovisual content is utilized.

The Description Definition Language (DDL) is the language that allows the creation of new Description Schemes and Descriptors. It also allows the extension and modification of existing Description Schemes. The DDL has to be able to express spatial, temporal, structural, and conceptual relationships between the elements of a DS, and between DSs.

DS (Description Schemes)

Among other DSs, the DS comprising Semantic DS are as follows.

(1) STime, which deals with semantic time descriptions. A semantic time description may be written without reference to any time standard, for instance "at Chrissy's birthday party, last year" is a reasonable semantic description of a time.

(2) SLocation which deals with semantic place descriptions. The same model applies to semantic locations as semantic times, for instance, "down the street" is a valid (if somewhat vague) semantic place.

(3) MediaLocator which connects the description to a media.

(4) MediaOccurrence: This DS is a lightweight segment, as annotation is lightweight semantic.

(5) AnalyticModel: This DS allows the use of non-verbal material in construction of descriptions.

(6) Object: This DS describes objects occurring in a media.

(7) Event: This DS describes events occurring in a media.

(8) SemanticDescription: This DS encapsulates a complete description of a narrative world. The concept of a narrative world is somewhat intuitive, it is a context plus the necessary objects and events to describe a situation that could be a movie, or a scene, or a shot, or it could also represent a situation that is described secondarily, in aiding the current description. Although such a scene, or narrative world may have multiple descriptions, each of these is handled by a single Semantic DS.

(9) Concept: This DS is an abstraction tool, that looks like semantic description.

(10) SemanticGraph: This DS is a graph of the relations between the DS in semantic descriptions.

(11) State: A bundle of attribute value pairs which allow the specification of parameter values at an instant of time or at a particular location.

(12) UsageDescription: A boolean indicating the purpose of a description, that is, whether it is intended as description or as an indexing element. There are other DS, for instance, for each DS within SemanticDescription that has access to media, as well as for the graph, there are counterparts within Concept.

(13) Semantic DS. This is used to hold one or several SemanticDescriptions or Concepts, or both. Further, abstract descriptions, in the form of Concepts, are stored in Classification Schemes, as part of the description of controlled terms.

Conventionally, these DSs are employed for describing semantic relationships that occur. When a new relationship is found, DSs are added to accommodate the new relationships. Disadvantageously, it is unclear whether the new DSs can support the new semantic relationships until some experimentation is carried out. Moreover, conventional techniques have limited expressive power for describing arbitrary structures.

Therefore there is a need to resolve the aforementioned problems and the present invention meets this need.

SUMMARY OF THE INVENTION

A first aspect of the present invention is a method for use in classifying, storage and retrieval of audiovisual information. The method uses the elements of a semantic description to describe any arbitrary structure related to the audiovisual information. The method includes: (1) providing entities describing non-relational parts of the semantic description, the entities including a concept having a collection of properties of the audiovisual information, and (2) referencing one or more interior structures of the concept from all entities in the semantic description.

According to another aspect of the present invention, the method further comprises augmenting a description field in a classification scheme or dictionary of descriptions to allow description of term by employing the concept.

According to another aspect of the present invention, the method further comprises construing links between the one or more entities as classification schemes or dictionaries for storage.

According to another aspect of the present invention, a method permitting description of audiovisual information characterized as an entity for describing non-relational parts of a semantic description, and employing a concept which is a collection of properties of the audiovisual information. The method includes comprising: determining a match for the entity in the concept; determining a match for a relationship the entity has with the concept; and building a graph that links the entity to one or more portions of the concept to produce a description of the audiovisual information.

According to another aspect of the present invention, the method further comprises storing an abstract of the description for use as templates.

According to another aspect of the present invention, the method further comprises storing the abstracts in classification schemes or dictionaries.

Advantageously, the present invention has a relatively high expressive power for describing arbitrary structures and no experimentation is needed to determine the expressive power.

DETAILED DESCRIPTION OF THE INVENTION

Definitions

Figure 1:
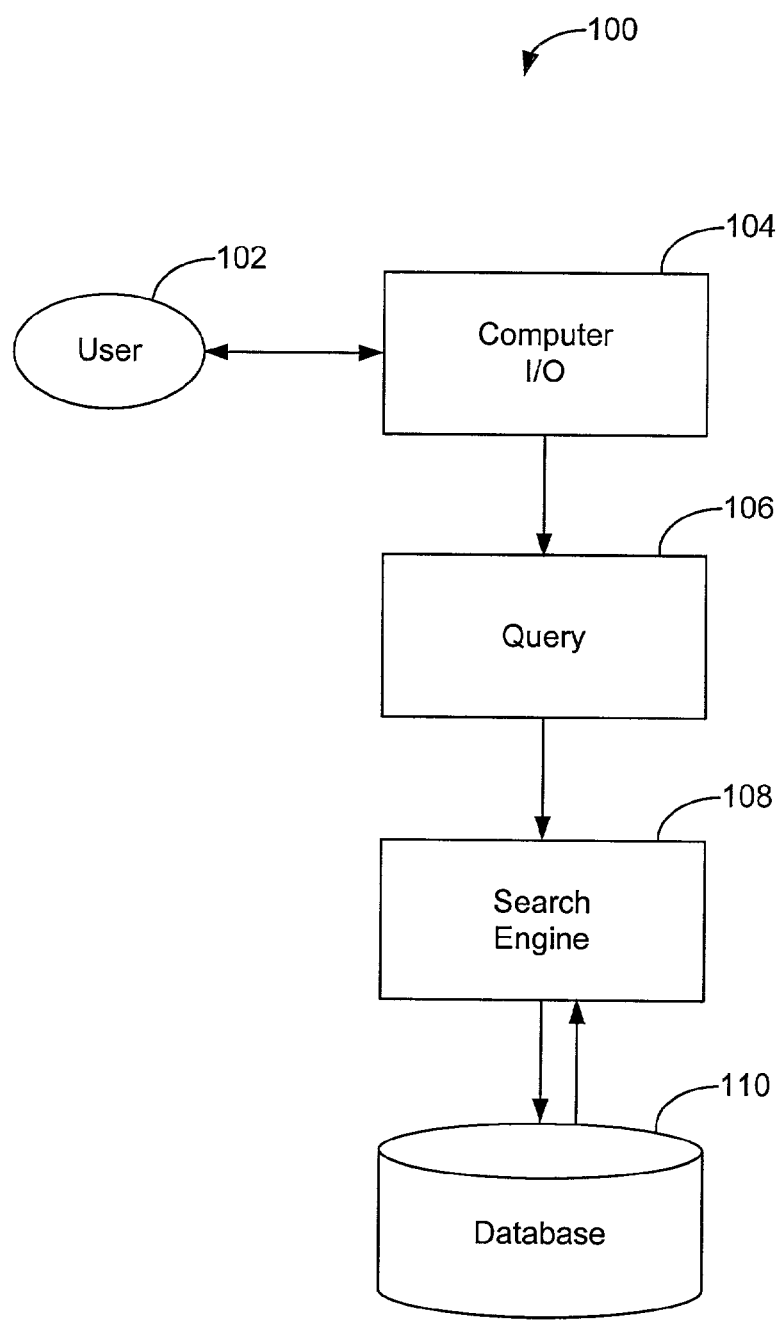
FIG. 1 is a block diagram of a system in which a first aspect of the present invention is employed.

The following definitions are exemplary and are intended to be limiting but rather to facilitate understanding of the present invention.

1. Entity—the term entity generically is used to describe any of the non-relational parts of a semantic description, that is, Objects, Events, SemanticTimes, SemanticPlaces, SemanticStates, Concepts, Semantic. Formally, these are all derived from a single base class.

2. Object—Any entity represented by an Object DS. Usually, these are objects in the colloquial sense, in that they occupy space, have duration and locality, although some objects may be less concrete than this.

3. Event—An occurrence which is delimited in time, or any temporal phenomenon described by an Event DS.

4. Concept—For the purposes of this document, a concept is a collection of properties. It is distinguishable from an object or event in that examples which demonstrate the concept at best allude to it, and do not show it. In this sense it is an abstraction that cannot be instantiated.

5. Semantic—A container description scheme which contains a single narrative world, that is, a single semantic description, of arbitrary complexity.

6. Description Scheme—An MPEG-7 Description scheme is a data structure written in MPEG-7 DDL (Description Definition Language) in a format corresponding to an XML schema.

7. Classification Scheme—A list, vocabulary, thesaurus or ontology written as a list with interconnecting relations, and embedded Classification Schemes (i.e. recursion). This is a description scheme in MPEG-7.

8. Graph Morphism—A mapping between graphs which takes nodes to nodes, edges to edges, and source and target to source and target. Specifically, if e is an edge in a graph G, and F is a morphism from G to H, then $F(s(e))=s(F(e))$, and $F(t(e))=t(F(e))$, where s(e) and t(e) are the source and target maps.

9. Projection maps—A projection map is an onto (surjective) map. In the context of products in categories, if A and B are two objects, and A×B is their product, then there is a mapping p taking any a×b in A×B to a, and another q taking a×b to b. If H is an object, then if there exist projections g from H to A and h from H to B, then there is a unique map f from H to A×B such that those projections can be written as $g=p \circ f$, and $h=q \circ f$.

10. Coproduct graphs—A coproduct graph is a graph generated from two (or more) other graphs by taking their coproduct. Specifically, if G is a graph and H is a graph, and there is a mapping f: C→G, and another g: C→H, we can form the coproduct of G and H over C by gluing G and H together at the points which correspond in C.

11. Injection maps.—An injection map is a map which is 1—1 (injective). In the previous definition (coproduct graphs), the maps f and g are injection maps. Note that there is a correspondence between coproducts and products and the injection maps correspond to projection maps in the product.

12. Subgraphs—A subgraph H={E',V',s',t'} of a graph G={E,V,s,t} is a graph such that E' is a subset of E, V' is a subset of V, and s' and t' are the restrictions of s and t to these subsets. Alternatively, a subgraph H of a graph G is a graph H together with an injection f: H→G, which is a graph morphism.

13. Topos—A topos is a category which has all finite products, all finite coproducts, exponentiation, an initial and a terminal element, and a subobject classifier. In terms of purpose, a topos is intended to be a category with sufficient structure to serve as a base for mathematics, in the manner of Set.

14. Link—For the purposes of this document, a link is a reference or pointer establishing a hyperlink between two MPEG-7 DDL documents, or within a single document.

15. Node—A node in a graph G={E,V,s,t} is an element of the set V.

16. Edge—An edge in a graph G={E,V,s,t} is an element of the set E.

17. Turing computible string—A turing computable string is any string that can be generated by running a Turing machine. This is often taken to mean any string that can be produced in finite time.

18. Instantiation—Instantiation is the opposite of abstraction. When a specific element of a description (e.g. "Tommy's red Mustang") is replaced by a generic quantity, so that the description can be reused (e.g. "car"), this process is called abstraction. Filling in "car" with "Tommy's red Mustang" is called binding, or instantiation.

19. Semiotics—Semiotics is the study of semantic meaning.

20. Simple DS: The present invention considers DS which do not participate in creating structures inherently to be simple DSs except as one end of a link, or as nodes in a graph, to be simple. For the present purposes, a DS is simple if the following are true: (1) It contains no recursion. A recursive DS necessarily implies structure, in that it allows the construction of a tree of like elements. (2) It is not a graph. Graph DS and its derivatives, as the name implies delineate a graph structure. (3) It does not contain elements fitting 1, and 2. DS with recursive or graph elements are necessarily structured.

STime, SLocation, MediaLocator, MediaOccurence, AnalyticModel, State, and UsageDescription are simple DSs. Using Graph DS, which are pervasive, structures may be put together from these, to create complex structured elements. For certain of these simple descriptors, this makes sense. Indeed, the reason for the construction of the STime and SLocation DS, is that it is anticipated that to create semantic descriptions which describe complex temporal or spatial situations, these will in fact be instantiated multiple times in a description, and related through links, or in the graph. A graph consisting entirely of STime can be used to construct a complex temporal description. That these occur in semantic descriptions of media can be seen in the following hypothetical example:

"In this scene, Harry cringes at the vivid memories of last Thanksgiving at his parents, when he flashed back at dinner, and thought he was back in 'Nam." The description given has three time frames occurring within one AV sequence. The description "In this scene, Harry runs into the girl he met in Chicago, while on the way to the zoo." likewise has three locations in its description.

20. Complex DS: A Complex DS has one or more of the above noted properties such as recursion, or graphical properties. Complex DSs with these properties are Semantic, SemanticDescription, Object, Event, Concept, and SemanticGraph. Of these, Semantic and SemanticDescription derive their structure by combining other complex DS only. This yields Object DS, Event DS, Concept DS and SemanticGraph DS.

21. Object and Event DSs: The syntax of Object DSs and Event DSs are quite similar. An object DS expresses a semantic object, an entity localized in space, for the purpose of referencing its occurrence in a media. Likewise, an event DS is used to express a temporally localized entity, for the same purpose. While Object and Event DSs are recursive, they do not allow other complex DSs to be expressed within them. That is, no Event DSs or Concept DSs within an Object hierarchy, and no Objects or Concepts within an Event hierarchy.

The purpose of the recursion in each case, and its default meaning is subdivision and refinement of description through subdivision. In this respect, these two DS are direct counterparts to the segments and regions within the Segment hierarchy. There is, however, no semantic counterpart to the spatiotemporal formulation available in the Segment trees. There is less formality in the structure than in the segment and region descriptions. There is no constraint on the size of a subobject, technically there is no constraint that it be a true subobject. Likewise, there is no semantic counterpart to expressing overlaps and gaps in Event.

22. Expressive power of Object DS and Event DS Both of object DS and event DS form trees, that is finite partially ordered sets with maximal elements. Since they may occur in large numbers within SemanticDescriptions), the sum total of the objects and events in a description form a forest of such trees. Because of the lack of constraints on these trees, we may add structure to either Object or Event, defining new objects or events from existing ones by union and intersection. This may be done by creating a sibling intersection of two (or more) objects at a particular level of the hierarchy. This object may then be linked to subobjects of each at the next level of refinement. Union is expressed by the parent node. In this way, either Object or Event may be construed as a lattice, and in effect, can be written to describe the lattice of subobjects or subevents of a particular object or event.

23. SemanticGraph DS: The descriptive power of graph structures can be proven to be equal to other structures of known descriptive power as described below. SemanticGraph DS allows both the construction of graphs and the constructions of graph morphisms. It allows the referencing of subgraphs through these graph morphisms, and it allows the creation of discrete graphs. As such it allows the creation of product graphs through the creation of morphisms expressing the projection maps, it allows the creation of coproduct graphs through the creation of morphisms expressing injection maps. Through the injection maps, it allows the specification of subgraphs, and power sets of graphs. The discrete graph with a single node and edge is the terminal object in the category Graph, node lists in the Graph DS specifically allow the construction of this graph. Graph DS is therefore capable of replicating the category Graph (theoretically), and therefore is a topos as a functor category of the form $Set^C$ with C small.

Within the context of Semantic DS, this means that the expressive power of the DS is essentially limited only by the restriction of link and node types. It should be observed that edges in Graph are chosen from any controlled list, or labeled with free text. Textual descriptions of the nodes are likewise either controlled text, free text, or other media (in the case of AnalyticModel).

Then the Semantic DS are capable of producing any description from natural language, and, formally, any Turing computable string. This latter is a consequence of the fact that Cartesian closed categories are equivalent to lambda theories, and the category of graphs is isomorphic to the category of categories. Both of these categories are Cartesian closed, a consequence of the fact that Graph is a topos.

24. Concept DS: Concept DS is intended for two purposes: to express information such as abstract objects or adjectival information for the purposes of a description, and to abstract SemanticDescriptions into templates. A SemanticDescription becomes a template by severing its references to a specific piece of video, and replacing specific objects in the description with generic classes. Such abstraction is useless unless it can then be instantiated, this requires building a set of correspondence links between descriptions (as embodied in the entities in SemanticDescription that access the described media), and the concepts they instantiate, or partially instantiate. One aspect of the present invention relatively increases this ability to instantiate. In accordance with a first aspect of the present invention, concept DS allows references to the interior structure of a Concept from all entities in a SemanticDescription.

25. Expressive power of Concept DS: As currently construed, Concept is a replication of the elements in SemanticDescription. As such, each Concept is capable of generating any description abstractly. Therefore, it is employed by the present invention for controlling the construction of descriptions, in essence a control for controlled terms. For both the preceding reason, and because Concept performs a template functionality, the present invention archives concept in Classification Schemes, or other similar lists. Further yet, the description field in a Classification Scheme is augmented to allow the description of a controlled term by a Concept. Reference to the term allows optional retrieval of the Concept.

26. Complex and Abstract Description Support: In part, the reason for examining the expressive power of Semantic DS is to relate it to known descriptive abilities in natural language and semiotics. In the present invention, Contexts are supported through the ability to create substitutions. This may be efficiently done via rule based models, as in Bauderon, M, and H. Jacquet, "Node Rewriting in Graphs and Hypergraphs: A categorical Framework." U. Bordeaux Technical Report, P. 1134–96. As described in Jacquet, rules and underlying alphabets are formed by graphs, which in Semantic DS would be ConceptGraphs, and the pullback is created which substitutes a construct for a node. This method takes care of the links that need to be rewired as a result, and the method requires that pullbacks can be constructed. These are taken care of by the graph morphism mechanism of Graph DS.

Blends are supported through the construction of pushouts. These can be thought of as correspondences which glue two descriptive graphs together. As described in _these allow juxtaposition of two descriptions to form a third, and allow the construction of metaphorical structures, as described in Fauconnier. Pushouts are supported in Graph DS by constructing graph morphisms and partial graph morphisms.

Although not shown, one of ordinary skill in the art will realize that various embodiments within the spirit and scope of the present invention for achieving the functionality of the present invention are possible. The present invention will be further understood with reference to the diagrams and descriptions which follow.

FIG. 1 is a block diagram of a system 100 in which one embodiment of the present invention is employed.

Among other components, system 100 includes a user 102 wishing to perform one or more tasks related to retrieval of audiovisual information; a computer input/output 104 such as a keyboard/monitor for receiving and outputting information to user 102, a query 106 which may be alphanumeric or audiovisual for obtaining information using a search engine 108, and a database 110 for storing the audiovisual information.

As noted, user 102 may wish to perform one or more tasks such as defining objects to describe a video for storage in database 110; drawing lines on the monitor to obtain in return audiovisual information such as images similar to the drawn lines; entering one or more musical notes, and obtaining a list of musical descriptions containing images of the described notes, etc. etc. As described with reference to FIG. 2, user 102 may describe, store or retrieve audiovisual information such as a wedding video, for example.

Figure 2:
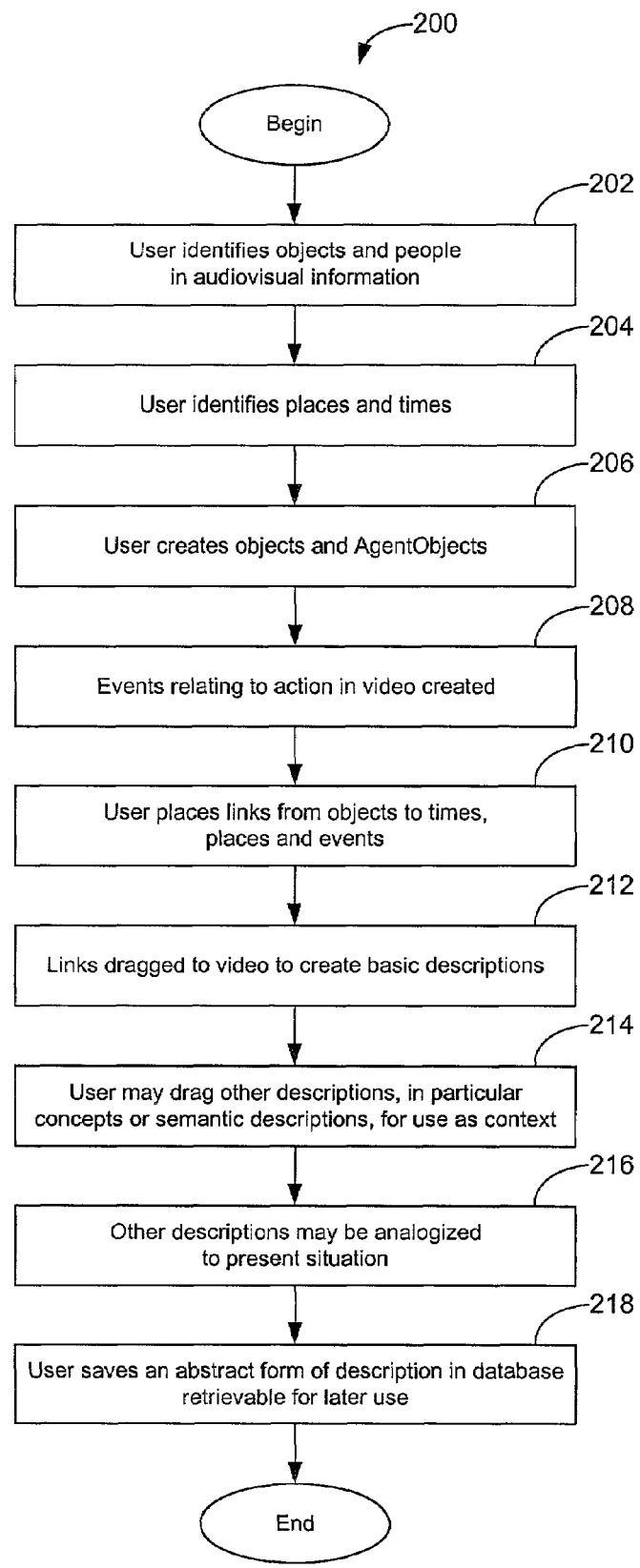
FIG. 2 is a flow chart showing an exemplary method for use in classifying, retrieval and storage of audiovisual information according to a first aspect of the present invention.

FIG. 2 is a flow chart showing an exemplary method for classifying;

retrieval and storage of audiovisual information in accordance with a first embodiment of the invention.

In FIG. 2, a method permitting description of audiovisual information e.g, a wedding video characterized as an entity for describing non-relational parts of a semantic description, which employs a concept is described. The entity is generically used to describe any of the non-relational parts of a semantic description, that is, Objects, Events, SemanticTimes, SemanticPlaces, SemanticStates, Concepts, Semantic. As noted, the concept is a collection of properties related to the wedding video.

At block 202, user 102 begins by identifying objects and people in the wedding video (not shown).

At block 204, user 102 thereafter identifies places and times in the wedding video.

At block 206, using standardized MPEG-7 tools, the user creates objects and AgentObjects for the object and the people.

At block 208, events relating to action in the video are created.

At block 210, user 102 places links from the objects to the times, places, and to the events.

At block 212, links are dragged to the video to create very basic descriptions.

At block 214, unlike conventional techniques, user 102 may drag other descriptions, in particular, concepts or semantic descriptions for use as context. More specifically, user 102 determines a match for both the entity in the concept, and for a relationship the entity has with the concept, to build a graph that links the entity to one or more portions of the concept to produce a description of the audiovisual information. In addition, one or more interior structures of the concept may be referenced from all entities in the semantic description.

At block 216, in a further aspect, the concepts are further used for analogies. That is, other descriptions may be analogized to the present situation. In addition, user 102 may drag previously created "clip art" style descriptions. Advantageously, links are then created to these contexts, analogies, and clip art to produce a rich description of the wedding video.

At block 218, user 102 saves an abstract form of description in database 110 wherein the description can be retrieved for later use via search engine 108. This abstract may be used as a template for further searches. Moreover, the abstract can be stored as a dictionary or classification schemes for combination with other stored descriptions. Another technique for developing the classification schemes is to store links between the entities as classification schemes. Each classification scheme contains a description field which may then be augmented to allow description of a term by employing a concept.

Advantageously, the present invention constraining relationships between entities in the Semantic DS. Further, as noted, Concept DS allows references to the interior structure of a Concept from all entities in a SemanticDescription. Further, the description field in Classification Scheme is augmented to allow the description of a controlled term by a Concept DS. Moreover, because the expressive power of the description schemes in Semantic DS is limited by the restraints on the relationship edges, the lists of acceptable relationships for SemanticGraph DS, ConceptGraph DS, and the Links between Semantic Entities are construed as Classification Schemes, and may be created for application specific purposes.

While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A computerized method comprising:
determining a match for an entity in a concept, wherein the entity describes a non-relational part of a semantic description, and the concept is a collection of properties of audiovisual information;
determining a match for a relationship the entity has with the concept; and building a graph that links the entity to a portion of the concept to produce an abstract of the semantic description of the audiovisual information.

2. The method of claim 1 further comprising:
storing the abstract of the description for use as a template.

3. The method of claim 1 further comprising:
storing the abstract in at least one of a classification scheme and a dictionary.

4. A computerized method comprising:
providing entities describing non-relational parts of a semantic description, the entities including a concept having a collection of properties of audiovisual information; and
referencing an interior structure of the concept from all entities in the semantic description to describe an arbitrary structure representing an abstract of the semantic description of the audiovisual information to subsequently classify, store and retrieve the audiovisual information.

5. The method of claim 4 further comprising:
augmenting a description field in at least one of a classification scheme and a dictionary of descriptions to allow description of a term by employing the concept.

6. The method of claim 4 further comprising:
construing a link between the entities as at least one of a classification scheme and a dictionary for storage.

7. A computer-readable medium having executable instructions to cause a computer to perform a method comprising:
determining a match for an entity in a concept, wherein the entity describes a non-relational part of a semantic description, and the concept is a collection of properties of audiovisual information;
determining a match for a relationship the entity has with the concept; and
building a graph that links the entity to a portion of the concept to produce an abstract of the semantic description of the audiovisual information.

8. The computer-readable medium of claim 7, wherein the method further comprises:
storing the abstract of the description for use as a template.

9. The computer-readable medium of claim 7, wherein the method further comprises:
storing the abstract in at least one of a classification scheme and a dictionary.

10. A computer-readable medium having executable instructions to cause a computer to perform a method comprising:
providing entities describing non-relational parts of a semantic description, the entities including a concept having a collection of properties of audiovisual information; and
referencing an interior structure of the concept from all entities in the semantic description to describe an arbitrary structure representing an abstract of the audiovisual information to subsequently classify, store and retrieve the audiovisual information.

11. The computer-readable medium of claim 10, wherein the method further comprises:
augmenting a description field in at least one of a classification scheme and dictionary of descriptions to allow description of a term by employing the concept.

12. The computer-readable medium of claim 10, wherein the method further comprises:
construing link between the entities as at least one of a classification scheme and a dictionary for storage.

* * * * *